US006393956B1

(12) United States Patent
Blum et al.

(10) Patent No.: US 6,393,956 B1
(45) Date of Patent: May 28, 2002

(54) DEVICE FOR CUTTING ANY WIDTH OF WOOD OR OTHER MATERIALS

(75) Inventors: Sven Blum, Merdingen; Peter Herbert, Waldkirch, both of (DE)

(73) Assignee: Interholtz Technik GmbH, Freiburg (DE)

( * ) Notice: Subject to any disclaimer, the term of this patent is extended or adjusted under 35 U.S.C. 154(b) by 0 days.

(21) Appl. No.: 09/381,573

(22) PCT Filed: Mar. 16, 1998

(86) PCT No.: PCT/DE98/00853

§ 371 (c)(1), (2), (4) Date: Sep. 17, 1999

(87) PCT Pub. No.: WO98/41369

PCT Pub. Date: Sep. 24, 1998

(30) Foreign Application Priority Data

Mar. 18, 1997 (DE) .................................... 297 05 755 U
May 2, 1997 (DE) .................................... 297 08 539 U

(51) Int. Cl.[7] ............................................... B23D 45/10

(52) U.S. Cl. .......................... 83/498; 83/499; 83/508.3; 83/698.61

(58) Field of Search .......................... 83/498, 499, 495, 83/501, 504, 508.2, 508.3, 698.51, 698.61, 699.51, 699.61, 665

(56) References Cited

U.S. PATENT DOCUMENTS 1,525,323 A 2/1925 Rabidou
3,540,340 A * 11/1970 Koskela ....................... 83/499
3,587,374 A * 6/1971 Stewart et al. ................. 83/56
4,196,649 A * 4/1980 Mariani ..................... 83/425.4
4,414,875 A * 11/1983 Pearson ..................... 83/508.3
4,580,086 A * 4/1986 Tokuno et al. .............. 318/603
4,592,259 A * 6/1986 Gorner et al. ................. 83/12
5,119,707 A * 6/1992 Fischer ........................ 83/698
5,125,301 A * 6/1992 Miller et al. ................... 83/13
5,378,221 A * 1/1995 Lauderbaugh et al. ...... 493/367
5,551,327 A 9/1996 Hamby et al. ............. 83/508.3
6,012,372 A * 1/2000 Laster et al. .................. 83/655

FOREIGN PATENT DOCUMENTS

DE 287 532 C 9/1915
EP O 386 744 9/1991
JP 60114413 6/1985
WO WO 89/10824 11/1989

OTHER PUBLICATIONS

E. Konig, "Holz Lexikon", pp. 101–102 and 468–469 (English translation of relevant parts).
E. Konig, "Holz Lexikon" pp. 101–102 and 468–469.

* cited by examiner

*Primary Examiner*—M. Rachuba
*Assistant Examiner*—Kim Ngoc Tran
(74) *Attorney, Agent, or Firm*—Christie, Parker & Hale, LLP

(57) ABSTRACT

A device for cutting wood or other materials comprises a saw blade clamping device for radially and/or axially fixing circular saw blades mounted axially displaceable on a drive shaft. Support bodies are provided axially displaceable on the drive shaft for each circular saw blade. The axial displacement of the circular saw blades takes place by guide spindles running parallel to the axis of the drive shaft and passing through the support bodies. At least one clamping element is mounted in the drive shaft 1, 20. The clamping element is mounted radially displaceable. In a first stage, the circular saw blades which are mounted on the support bodies are thereby displaced. In a second stage, the circular saw blades or support bodies are connected to the drive shaft in keyed and/or force locking engagement. Through the device, a displacement of the cutting width is possible without the time and labor intensive dismantling of the saw blades. The support bodies for the circular saw blades are narrower than the known displacement heads for multi-blade circular saws. A larger number of circular saw blades can thereby be fitted on one axis.

22 Claims, 5 Drawing Sheets

DEVICE FOR CUTTING ANY WIDTH OF WOOD OR OTHER MATERIALS

DESCRIPTION

The invention relates to a device for cutting wood or other materials to a width of any size according to the preamble of claim 1.

A cutting device of this kind is used inter alia in commercially available multi-blade or circular trimming saws. The main design structure of these appliances is described by way of example in the Holz Lexikon of E. Konig, DRW Verlags GmbH, Stuttgart, 1977, 2nd edition, Volume I : pps. 101–102 and Vol. II : pps. 468–469. These types of circular saws generally have two or more circular. saw blades set on a drive shaft wherein the distance between the blades is variable.

In order to guarantee a free cutting, the circular saw blades are designed mostly wider in the cutting area for example by setting the saw blade. A resulting cutting width is thus produced from the distance of the side cutting edges of two adjoining circular saw blades. However the resulting cutting widths can generally only be inadequately anticipated just by measuring the distance. Frequently after a rough pre-setting a test sample has to be cut followed by finer re-adjustment.

Adjusting the cutting widths is undertaken in the simplest case by a multi-blade saw box which is assembled outside of a machine and on which the individual saw blades are placed, spaced out and fixed for no further adjustment. When changing a blade the saw box is replaced as a whole in order to keep the times during which the machine is stationary as short as possible.

With these machines changing the cutting width is only possible by a time-consuming labour-intensive tool change since the saw blades which are once located in the machine can no longer be axially displaced on the drive shaft. In the event of re-adjustment the complete saw box has to be dismantled again so that for example the relevant cutting width can be adjusted to the required extent for example by inserting further spacer members.

These drawbacks are overcome in appliances where a variable cutting width adjustment is undertaken by electronically controlled, motor-operated or hydraulically-operated axial displacement of one or more saw blades. In the company catalogue 2/94 "Multi-blade circular saws and circular trimming saws" of Messrs. Interholz Raimann GmbH a four-fold blade adjustment system is illustrated on page 12, FIG. 6. Each of the individual saw blades is mounted on a separate displacement head which guarantees by means of a gripper-like arm through a motor-driven spindle an axial displacement and accurate positioning of each individual saw blade. Positioning the individual saw blades and any re-adjustment which might possibly be required are thereby effected through electronic path measuring devices and accurately controlled spindle motors.

Appliances of this kind are very cost-intensive and can only be used economically in the case of cutting widths which have to be frequently changed. The same drawbacks arise also for the circular saws described in WO 89/10824 whose four driven axles provided with circular saw blades are adjustable separately by servo cylinders. Further drawbacks of the motor-driven adjustable multi-blade and circular trimming saw blades described above are the limited number of saw blades which are to be used at the same time as well as the greater minimum cutting width compared to multi-blade saw boxes since the comparatively wide construction of the displacement heads does not allow the individual saw blades to be positioned closely next to each other.

Furthermore from U.S. Pat. specification 15 25 323 a device is known for cutting materials to any width which has two circular saw blades (12, 12') which by means of a centrally aligned drive shaft (11) execute a rotational cutting movement and wherein to vary a cutting width at least one circular saw blade is mounted axially displaceable on the drive shaft wherein disc-like support bodies (50, 60) are provided mounted axially displaceable on the drive shaft and on which at least each one circular saw blade (12) is to be fixedly mounted wherein the axial displacement of the circular saw blades is carried out by means of guide spindles (52, 62) running parallel to the axis of the drive shaft (11) and passing through the support bodies and which during the circular cutting movement of the circular saw blades are moved on a circular path about the axis of the drive shaft (11).

The object of the invention is to develop a device for cutting wood or other materials to a width of any size, which provides a flexible, cost-effective displacement which can be carried out inside the machine and which can be reliably fixed during the sawing operation wherein the cutting widths can be controlled and adjusted by means of a suitable measuring system.

This is achieved according to the invention through a cutting device having the features of claim 1.

According to the invention the cutting device has disc-shaped support bodies mounted axially displaceable on the drive shaft and on each of which at least one circular saw blade can be fixedly mounted by means of a suitable saw blade socket. Axial displacement of the circular saw blades takes place by means of guide spindles running parallel to the drive shaft axis and passing through the support bodies wherein the guide spindles are moved during the circular cutting movement of the circular saw blades on a circular path around the axis of the drive shaft.

By arranging the guide spindles about the axis of the drive shaft and positioning them in the disc-like, axially displaceable support bodies which are rotationally secured to the drive shaft it is possible to provide a compact method of construction which with a symmetrical arrangement of the guide spindles on the smallest possible circle circumference lying concentric with the axis of the drive shaft guarantees a smoothly balanced cutting movement with the smallest possible additional mass inertia forces. During the adjustment process when the drive shaft is stationary the guide spindles which preferably have a thread, e.g. a trapezoidal thread, serve to transfer the force and motion to the relevant support bodies which are to be axially displaced.

Through such an arrangement it is ensured that the adjustment of the cutting width can be carried out, as opposed to using multi-blade saw boxes, without any time-consuming labour-intensive dismantling of the saw blades inside the machine. Rather the support bodies are designed significantly narrower compared with the displacement heads of known motorized adjustable multi-blade and circular trimming saws, so that it is possible to provide smaller minimum cutting widths and/or a larger number of circular saw blades which can be fitted.

As a rule one circular saw blade is provided for each axially displaceable support body. The invention also includes variations wherein several circular saw blades are to be fixed on one support body and which then have a fixed space from each other and can only be axially displaced together. However variations are likewise also possible wherein no circular saw blade is mounted on individual support bodies. This can then be advantageous for example when during one work process there are fewer circular saw blades required than the number of support bodies, but dismantling the excess support bodies from the cutting device would be uneconomic however.

In a preferred embodiment of the invention at least one support body is axially fixed. This support body is preferably located on the outside at the end of the guide spindles whose ends are mounted in same freely rotatable, but axially immovable. A favourable distribution of the centrifugal forces which arise during the cutting movement is thereby produced.

A circular saw blade is preferably mounted on the axially fixed support body to be used as the reference from which the further cutting widths are determined. However there are also further possible variations wherein no circular saw blade is mounted on the fixed support body so that all the saw blades are axially displaceable.

In a preferred variation of the invention the individual displaceable support bodies are each to be displaced axially independently of each other. Thus only one support body is only displaced by means of each guide spindle whilst the other support bodies remain unaffected by the activated guide spindle.

One support body is preferably axially displaced by two diametrically opposite guide spindles mounted at the same distance from the axis of the drive shaft. The group of guide spindles resulting from this is preferably to be mounted on a circular circumference which lies concentric with the axis of the drive shaft. This arrangement allows a symmetrical distribution of the guide spindles at the same distance around the axis of the drive shaft.

By using two diametrically opposite guide spindles for each displaceable support body it is possible to guarantee during the axial displacement of the support body a transfer of movement engaging symmetrically relative to the axis of the drive shaft. The invention also includes variations wherein more than two guide spindles are provided per one axially displaceable support body.

The relevant associated guide spindles carry out a transport movement which serves for the axial displacement and which preferably corresponds to a rotational movement about the relevant longitudinal axis and which can be synchronised by means of gearing between the two spindles. Through the synchronised transport movement of the guide spindles in the same or opposite directions it is possible to reduce the risk of canting and/or jamming of the support bodies on the drive shaft. In one variation of the invention this gearing is designed as belt gearing. The invention also includes variations wherein the coupling of the transport movement is achieved by other gearing, e.g. gearwheel or chain gearing.

In a preferred variation of the invention the or each gearing is mounted inside a drive housing. On the one hand this produces a compact method of construction and on the other ensures that for example during a finishing process no impurities in the form of chippings can clog up or block the individual gears.

According to the invention in one variation of the invention stud attachments are provided for adjusting the cutting widths by means of which the relevant guide spindles can be driven to produce their transport movement. The transport movement is thereby to be applied to the relevant stud attachments manually or motorized by means of a suitable tool. This tool can be for example a correspondingly precision-shaped key which can be set on the relevant stud attachment and operated manually, or a motor-operated screw driver whose drive shaft is to be coupled rotationally secured to the relevant stud attachment. The invention also includes variations wherein the transport movement of each guide spindle to be driven can be applied centrally with means belonging to the actual sawing machine, thus inside in the machine.

The stud attachments are preferably shaped from the extended ends of the guide spindles so that the transport movement can be applied simply direct to a guide spindle.

In a preferred variation a complete set of support bodies inclusive of the circular saw blades mounted thereon can be assembled together with the associated guide spindles and the drive housing as a structural unit outside of the machine chamber and in the event of a tool change can be pushed and fixed onto the drive shaft like a saw box. The fixing is preferably undertaken axially by means of a grooved nut. The cutting device according to the invention can be fitted out like a multi-blade saw box and allows pre-setting of the cutting widths outside of the machine.

With comparatively low setting-up costs a cutting device of this kind combines the advantages of a multi-blade saw box, such as quick tool block change, with small cutting widths and furthermore allows the cutting widths to be adapted without dismantling the device.

A saw blade clamping device is provided for radially and/or axially fixing circular saw blades which are mounted axially displaceable on a drive shaft. This saw blade clamping device has at least one clamping element which is mounted in a drive shaft like a piston and which is to be displaced radially by means of a hydraulically produced force action. In a hydraulically unstressed starting position of the clamping elements the circular saw blades can be displaced as up to now axially on the drive shaft. Through hydraulically produced compression forces the clamping elements can however be brought into an end position where the circular saw blades are connected in keyed and/or force-locking engagement rotationally secured with the drive shaft so that they can no longer be axially displaced on the drive shaft.

The saw blade clamping device has the advantage that a secure clamping of a variable number of circular saw blades in any position is possible. Neither saw boxes nor intermediate rings are required to set a fixed distance between the individual circular saw blades which is not to be adjusted during the sawing operation. Through the saw blade clamping device an immovable secure locking of the individual circular saw blades on the drive shaft is guaranteed during the sawing operation. The saw blade clamping device is also to be used independently of the cutting device according to the invention. Thus for example the clamping device according to the invention can also be used in conjunction with electrically, hydraulic or manually axially positioned circular saw blades.

With the cutting device according to the invention it is possible by means of the saw blade clamping device to achieve an axial securing of the positioned circular saw blades, a relaxation of the guide spindles and a blocking of a slight axial mobility as a result of the threaded play. In each case compared to the use of saw boxes there is a significant saving of both time and labour when setting the cutting widths since the circular saw blades can be axially displaced immediately when required through the lock which is quick and easy to release and which can then be re-locked again.

Through the tight seal of the clamping elements relative to the drive shaft, on the one hand there is no risk of the circular saw blades or the workpieces which are to be processed becoming soiled e.g. through hydraulic oil, and on the other the clamping device itself is not susceptible to contamination through swarf or the like. A large proportion of the swarf arising is moreover kept away from the device during the sawing operation through centrifugal forces.

The circular saw blades are preferably mounted fixed on disc-like supports bodies according to claim 1 or in known way on blade socket rings provided for this purpose. By means of the support bodies or the blade socket rings it is possible to mount the circular saw blades axially displaceable on the drive shaft. Since both the support bodies and the blade socket rings can be made significantly narrower than the displacement heads of known motorized adjustable multi-blade and trimming circular saws, it is possible to provide smaller minimum cutting widths and/or a larger number of circular saw blades which can be mounted.

In a preferred design of the invention the clamping elements correspond in form and action to a radially displaceable locking key, of which preferably two are provided wherein these are mounted diametrically opposite on the drive shaft. The invention also includes variations wherein only one clamping element or wherein more than two clamping elements are provided. Clamping elements can likewise be provided which have profiling engaging for example in the locked state in corresponding profiling of the circular saw blades, support body or blade socket rings, in order to produce for example an additional keyed connection.

In an advantageous variation of the invention a maximum radial displacement of the clamping elements is to be restricted by lift restricting elements, more particularly lifting screws. These are expedient for example so that the clamping elements do not fall out of their bearing when no circular saw blades are fitted on the drive shaft.

In a preferred embodiment of the invention the hydraulic force action is to be applied by means of a piston which is to be displaced manually or by means of a motor. The piston is to be displaced axially in the event of manual operation for example by a handle or a hand wheel through a threaded bolt which is to be screwed in and out of a thread.

In a further variation of the invention the hydraulic force action is to be applied by means of a hydraulic device inside the machine or hydraulic device outside of the machine. Since many machines already have a hydraulic device inside the machine a build up of pressure which is required to lock the circular saw blades or to radially displace the clamping elements is also to be applied by means of a device of this kind. The saw blade clamping device according to the invention is integrated in a hydraulic control and is thereby to be operated quickly, easily and reliably in simple manner. The same also applies in the case of a connection of the saw blade clamping device to a hydraulic device outside of the machine.

In an advantageous variation the saw blade clamping device according to the invention has a manometer by means of which the hydraulic force action can be monitored. A manometer for reading the pressure with which the support bodies or blade socket rings are clamped, makes it possible to check whether there is sufficient locking of the circular saw blades with a view to a safe operating process.

In a preferred variation of the invention a measuring system is provided for adjusting the cutting width wherein the distance between the side cutting edges of two adjoining circular saw blades which are displaceable relative to each other can be measured.

The measuring system preferably has a measuring plate with measuring surfaces which is connected, by a rotatable extensible rod mounted parallel to the axis of the drive shaft, to a path measuring system mounted fixed relative to the drive shaft. The invention also includes variations wherein a measuring system of this kind is to be used outside of the machine, for example where the cutting device is assembled like a structural unit.

In an advantageous design of the invention an adjustable measuring plate is provided as the measuring plate which has two measuring faces which lie parallel to each other in a common plane at right angles to the axis of the drive shaft and which point in opposite directions. The measuring system thereby preferably has an indicator which is to be set to zero at any measuring point so that the cutting widths can be detected in the form of incremental increase or chain measurements.

In a particularly advantageous design of the invention the measuring system has a measured value memory and a computer unit. In the measured value memory the individual measuring points can be stored in the form of incremental chain or increase measurements and/or in the form of reference measurements in relation to a reference point and can be processed mathematically with each other in the computer unit.

The effects of a cutting width adjustment on the other cutting widths and the adaptations which are to be made can thereby be detected immediately. The measuring system preferably has a display in which both the measured value in relation to a reference point fixed relative to the drive shaft (reference measurement) and also the incremental measured value in relation to a freely selectable reference point through nullification of the display (chain measurement) can be displayed.

This variation has the advantage that a rapid determination of the distance between the cutting edges of two adjoining saw blades is possible. It is thereby possible during the adjustment or setting process to keep a constant check that the required distance between the cutting edges is being observed.

Further advantages of the invention will now be explained in the following description of the embodiments with reference to the drawings in which:

FIG. 1 shows a cutting device with seven circular saw blades and a measuring system for setting the cutting width;

FIG. 2*a* shows the guide of a guide spindle in a support body with threaded bore;

FIG. 2*b* shows the guide of a guide spindle in a support body with through bore;

Figure 1:
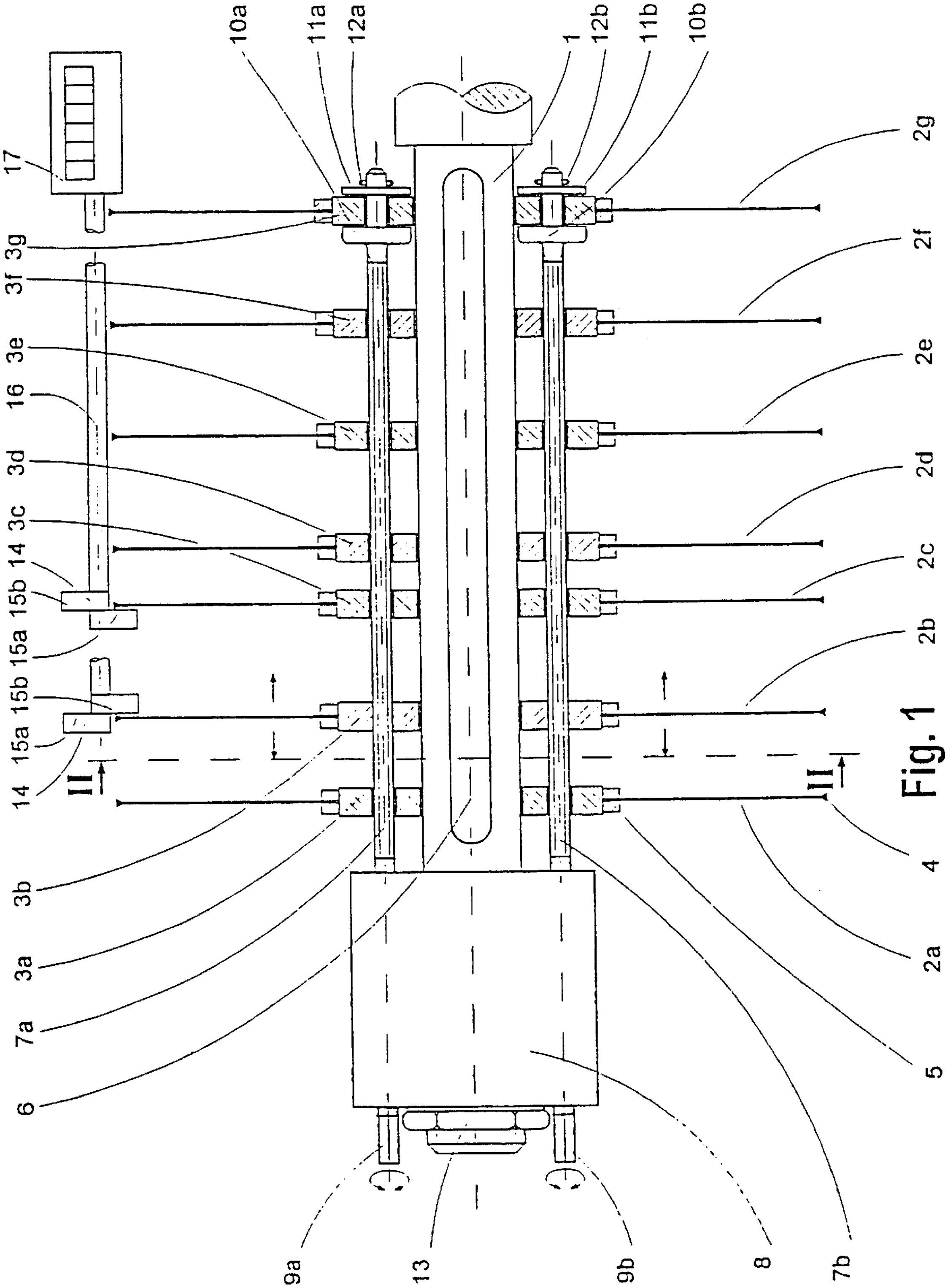

FIG. 1 shows an embodiment of the cutting device according to the invention. The drawing shows a drive shaft 1 of a saw machine on which seven circular saw blades 2*a* to 2*g* are mounted each by means of a disc-like support body 3*a* to 3*g*, shown in section. The circular saw blades 2*a* to 2*g* have blades 4 on their outer circumference and are each fixed in known way on the support bodies 3*a* to 3*g* by means of saw blade sockets 5. The support bodies 3*a* to 3*g* are mounted by means of a locking key 6 rotationally secured on the drive shaft. They have several recesses in which guide spindles 7*a,* 7*b* are mounted running parallel to the axis of the drive shaft 1. The guide spindles, of which for clarity in FIG. 1 only two are illustrated, have a trapezoidal thread and engage through a drive housing 8 shown only diagrammatically. They have at their ends projecting out of the drive housing 8 stud attachments 9*a,* 9*b* which in the illustrated embodiment have a square cross-section. The other ends of the guide spindles 7*a,* 7*b* each have two discs ll*a* to lid and each have two fastening pins 12*a* to 12*d* by means of which one of the support bodies 7*g* and the circular saw blade 2*g* mounted thereon are axially fixed. The cutting device is fitted as a whole, like a saw box, onto the drive shaft 1 and fastened by means of a shaft nut 13.

In the embodiment by turning the stud attachments 9*a,* 9*b* in one of the directions illustrated by the arrows, one of the circular saw blades 2*b* can be displaced axially to the left or right in the direction of the arrow. The rotational transport movement of the two guide spindles 7*a,* 7*b* is coupled in the drive housing by means of a belt gearing so that only one of the two guide spindles 7*a,* 7*b* is to be driven through the relevant stud attachment 9*a,* 9*b.*

Figure 2A:
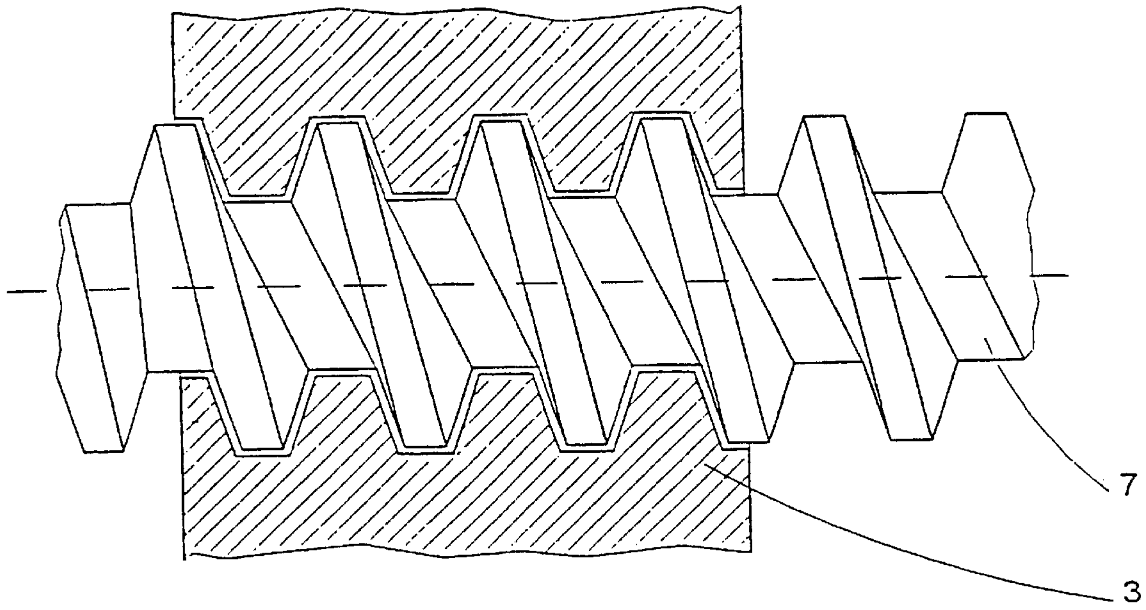
Figure 2B:
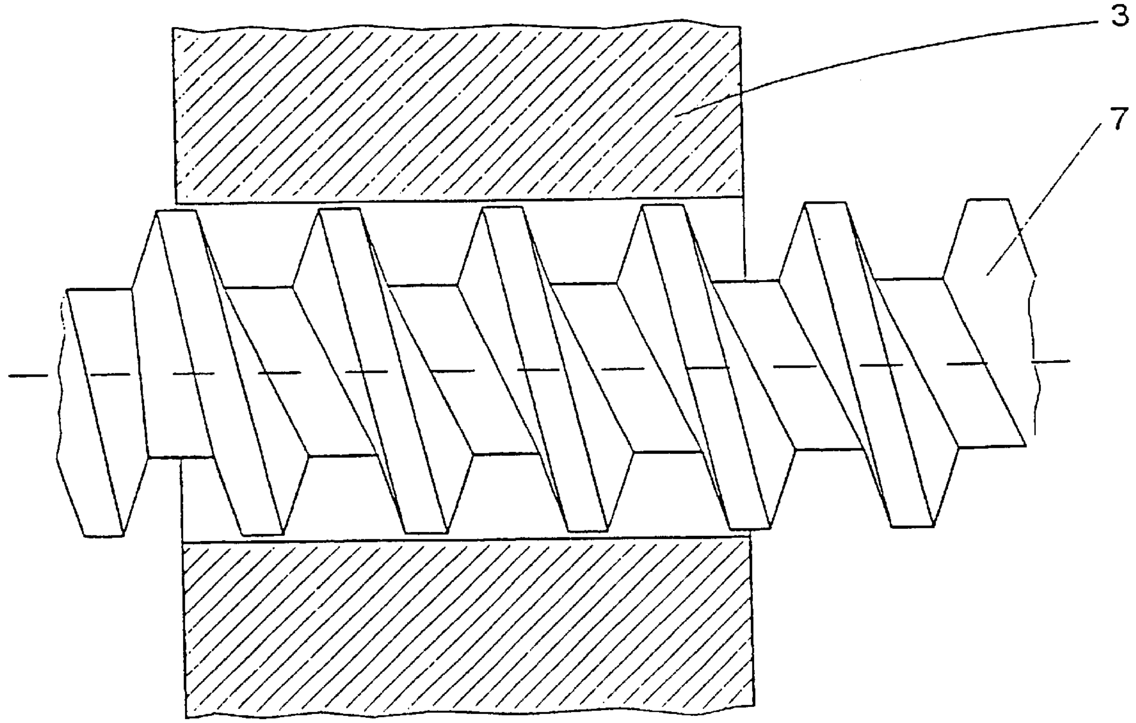

The support body 3*b* and the circular saw blade 2*b* mounted thereon are moved axially by the rotating guide spindles 7*a,* 7*b* since as shown in FIG. 2*a* the external thread of the guide spindle 7 engages in a corresponding internal thread of the recesses in the support body 3 through which it passes. The other support bodies 3*a* and 3*c* to 3*g* are not affected by the rotating guide spindles 7*a,* 7*b* since, as illustrated in FIG. 2*b,* the recess of the relevant unaffected support body 3 through which the guide spindle 7 passes has a correspondingly large diameter and no internal thread.

For axially displacing the other support bodies 3*a* and 3*c* to 3*f* other guide spindles which are not shown for reasons of clarity, are to be driven. The support body 3*g* is axially fixed and is to be displaced by no guide spindle.

In the illustrated embodiment each axially displaceable support body 3*a* to 3*f* is faced by each two guide spindles which are diametrically opposite one another and which are all mounted together at the same distance from the axis of the drive shaft 1. With six displaceable support bodies 3*a* to 3*f* the embodiment illustrated has overall twelve guide spindles.

Figure 3:
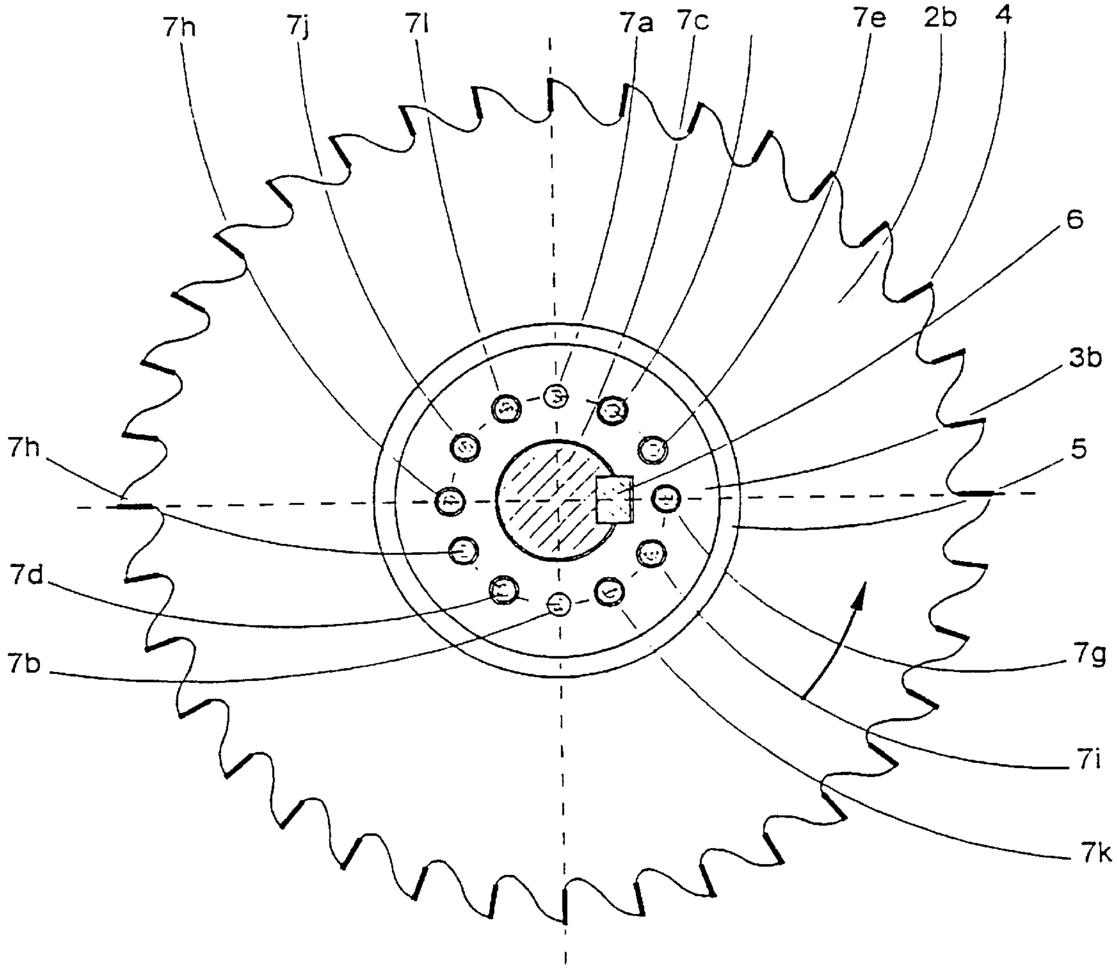
FIG. 3 is a side view of a circular saw blade mounted displaceable on the drive shaft.

In FIG. 3 the axially displaceable circular saw blade 2*b* of FIG. 1 is shown in side view (section III—III). It is mounted by means of the saw blade socket 5 in known way on the support body 3*b.* The support body 3*b* is connected rotationally secured to the drive shaft 1 by means of a locking key 6. Overall twelve guide spindles 7*a* to 7*l* symmetrically spaced out at the same distance from the axis of the drive shaft pass through the support body 3*b.* Two diametrically opposite guide spindles 7*a,* 7*b* engage as in FIG. 2*a* into an internal thread of the recesses through which they pass whilst the remaining ten guide spindles 7*c* to 7*l* are mounted as in FIG. 2*c* without action freely rotatable in the support body 3*b.*

The seven support bodies 3*a* to 3*g* illustrated in FIG. 1 are accordingly not structurally identical since the position of the groove for holding the locking key 6 relative to the recesses with the internal thread differs each time and the support body 3*g* has no recesses with thread.

Furthermore in FIG. 1 a measuring system is shown diagrammatically which has a reversible measuring plate 14 which has two measuring faces 15*a,* 15*b* which lie parallel to each other in a common plane at right angles to the axis of the drive shaft 1 and which point in opposite directions. The reversible measuring plate 14 is connected by a rotatable and extensible rod 16 mounted parallel to the axis of the drive shaft 1 to an evaluating and indicator device 17 of a path measuring system.

The two measuring faces 15*a,* 15*b* serve to measure the distance between the side cutting edges of the blades 4 of two adjoining circular saw blades 2*a* to 2*g.* In the illustrated embodiment the position of the reversible measuring plate 14 is shown at two different measuring points which are to be used when determining the distance between the cutting edges 4 of the circular saw blades 2*b* and 2*c.* Between the two measuring points the reversible measuring plate is to be turned 1800 parallel to the axis of the drive shaft 1.

Preferably during adjustment the axially fixed circular saw blade 2*g* is used as the starting point. The reversible measuring plate 14 is to be placed with the corresponding measuring surface 15*a* against the side cutting edge (in FIG. 1 left-hand cutting edge) of the blade 4 of the axially fixed circular saw blade 2*g.* The indicator is set to zero, the reversible measuring plate 14 is to be turned and placed with the other measuring face 15*b* against the side cutting edge (in FIG. 1 the right hand cutting edge) of the circular saw blade 7*f* adjoining same. By turning the stud attachment provided for this circular saw blade 7*f* the circular saw blade 7*f* is to be axially displaced until the desired measurement is provided. The same procedure is followed when setting the remaining measurements. The circular saw blade which is last adjusted is then to be regarded as the fixed saw blade.

An additional measured value memory and computer unit can furthermore also allow the setting of the circular saw blades and to check them relative to a fixed common fixing point in order to minimize the risk of error magnification and to simplify a subsequent change in the measurements.

Figure 4:
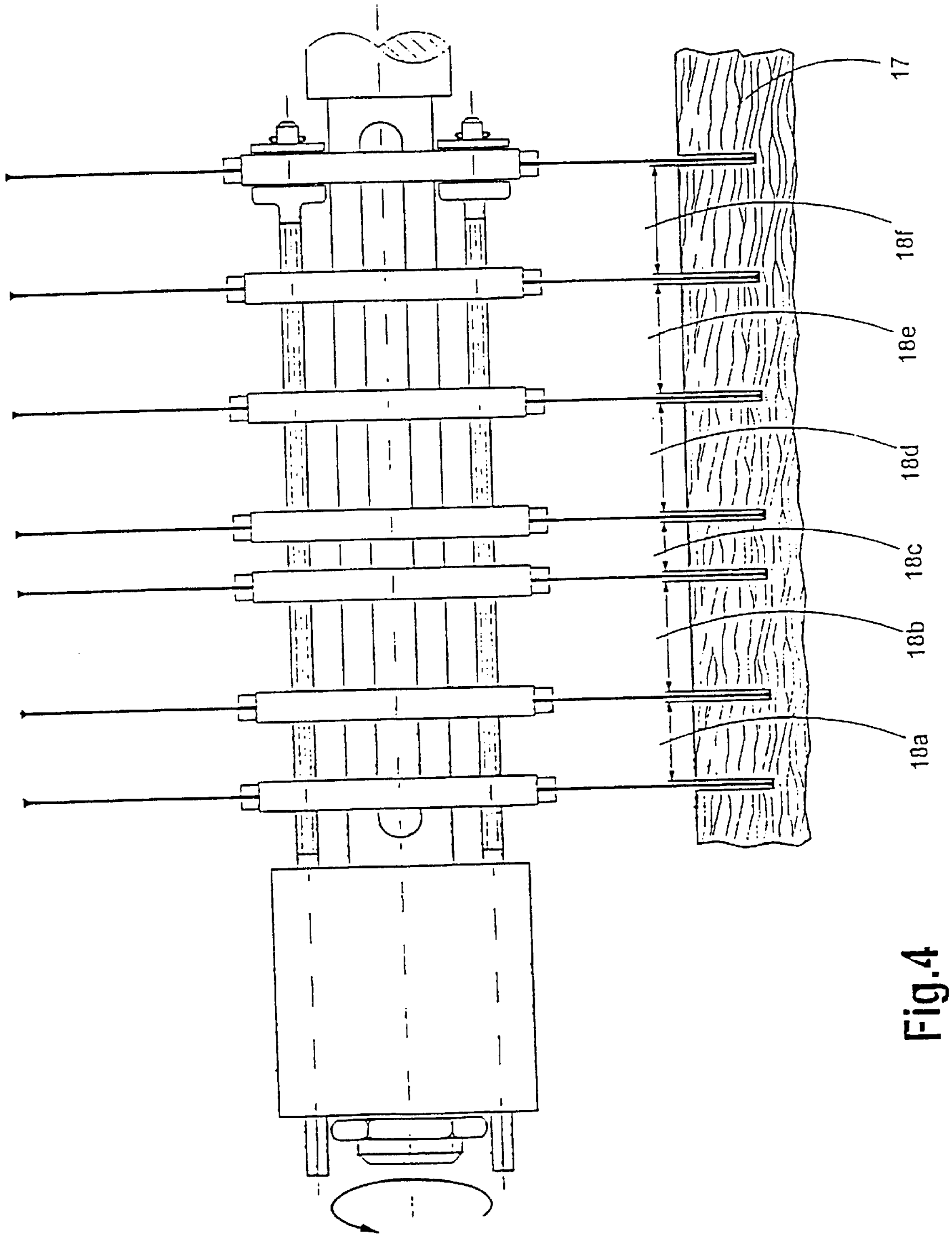
FIG. 4 shows a cutting device with seven circular saw blades during the sawing process and FIG. 5 shows a hydraulically operable saw blade clamping device.

In FIG. 4 the embodiment of the cutting device according to the invention described in FIG. 1 is shown for cutting into a wooden plank. The different resulting cutting widths 18*a* to 18*f* can be clearly seen.

Figure 5:
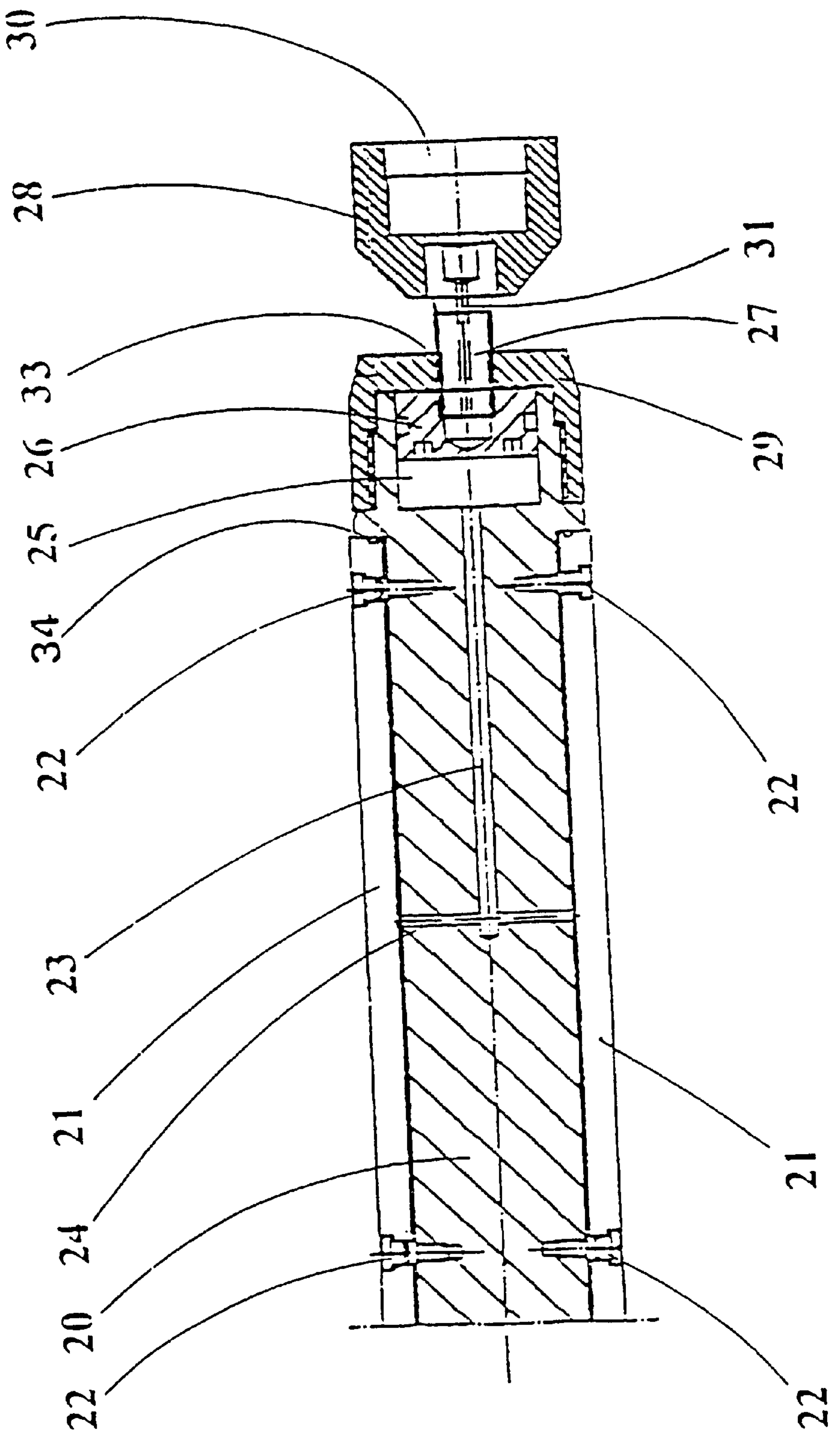

FIG. 5 shows a hydraulically operated saw blade clamping device. Two clamping elements 21 are mounted in the drive shaft 20 and have substantially the form of a locking key and are guided like a piston in correspondingly accurately shaped axially aligned recesses of the drive shaft 20 and are sealed in known way by a seal 34 to prevent oil leakage. The clamping elements 21 lie diametrically parallel opposite one another on the drive shaft 20 and are restricted in their radial stroke through lift screws 22. The drive shaft 20 has a central blind hole bore 23 which is connected at its inner end to a radially aligned through bore 24. The radial through bore 24 ends each time on the underneath of the clamping elements 21. The drive shaft 20 has at the outlet point of the central blind hole bore 23 a pressure chamber 25 in which a piston 26 is mounted axially displaceable. The piston 26 is connected by a threaded bolt 27 to a manually operated pressure generating button 28. The pressure generating button 28 can be designed optionally with or without manometer 30. The manometer 30 is connected through a central bore 31 in the threaded bolt 27 and through channels in the piston 26 to the pressure chamber 25. The channels in the piston 26 are not shown in further detail for reasons of clarity. The pressure chamber 25 and the piston 26 mounted therein are to be closed pressure tight by a cover 29 which is to be screwed onto the drive shaft 20. The threaded bolt 27 is guided in a central threaded bore 33 of the cover 29.

By turning the pressure generating head 28 a hydraulic pressure is produced through the threaded bolt 27 by means of the piston 26 in the pressure chamber 25 which is filled with oil. This pressure is brought up to the clamping elements 21 through the central blind hole bore 23 and the radial through bore 24 in the drive shaft 20. The clamping elements 21 are formed as pistons and can travel a certain stroke. They clamp the circular saw blades 2*a* to 2*g* (not shown in this figure) in the individually desired positions. On the manometer 30 it is possible to read the pressure with which the support bodies 3*a* to 3*g* (likewise not shown) or the blade socket rings are clamped.

What is claimed is:

1. A device for cutting materials comprising:
   - at least two circular saw blades;
   - a centrally aligned drive shaft that is movable to provide a rotary cutting movement to the at least two circular saw blades, and wherein at least one circular saw blade is mounted displaceable axially on the drive shaft to vary a cutting width of the materials to be cut;
   - disc like support bodies axially displaceable on the drive shaft, wherein at least one circular saw blade is fixedly mounted on each support body, wherein each support body has a nut;
   - guide spindles running parallel to the axis of the drive shaft and engaging through the support bodies, wherein the guide spindles carry out the axial displacement of the circular saw blades, wherein the guide spindles are movable during the circular cutting movement of the circular saw blades on a circular path about the axis of the drive shaft; wherein the guide spindles are fixed axially on the drive shaft and wherein each guide spindle is associated with a respective single one of the support bodies and is screwed into the associated nut of the respective single one of the support bodies; and
   - a hydraulic clamping element commonly fixing the support bodies onto the drive shaft.

2. The cutting device according to claim 1 wherein the guide spindles include two diametrically opposite guide spindles mounted at an equal distance from the axis of the drive shaft, wherein the two diametrically opposite guide spindles displace one support body of the support bodies.

3. The cutting device according to claim 2 further comprising gearing that synchronizes transport movements of the two diametrically opposite guide spindles that axially displace the one support body.

4. The cutting device according to claim 3 wherein the gearing is a belt gearing.

5. The cutting device according to claim 3 further comprising a drive housing wherein the gearing is mounted inside the drive housing.

6. The cutting device according to claim 1 further comprising stud attachments that drive the relevant guide spindles to produce transport movement of the guide spindles to set the cutting widths.

7. The cutting device according to claim 6 wherein the stud attachments are shaped from extended ends of the guide spindles.

8. The cutting device according to one of claims 6 or 7 wherein the transport movement is produced by manual application to the stud attachment.

9. The cutting device according to claim 6 wherein a suitable tool motorizes the guide spindles to produce the transport movement.

10. The cutting device according to claim 1 wherein the support bodies, the circular saw blades, the associated guide spindles and a drive housing are assembled as a structural unit, wherein the structural unit is capable of being pushed onto the drive shaft and fixed on the drive shaft.

11. The cutting device according to claim 1 wherein the circular saw blades are fixedly mounted on the disc-like support bodies.

12. The cutting device according to claim 1 wherein the clamping element corresponds in shape and action to a locking key.

13. The cutting device according to claim 1 wherein there are two clamping elements diametrically opposite one another on the drive shaft.

14. The cutting device according to claim 1 further comprising lift restricting elements restricting radial displacement of the clamping element.

15. The cutting device according to claim 1 further comprising a displaceable piston applying hydraulic force action associated with the clamping element.

16. The cutting device according to claim 15 further comprising a machine applying the hydraulic force action and a hydraulic appliance associated with the machine for applying the hydraulic force action.

17. The cutting device according to claim 15 wherein the saw blade clamping device has a manometer monitoring the hydraulic force action.

18. The cutting device according to claim 15 wherein the piston is motor driven.

19. The cutting device according to claim 15 wherein the piston is driven manually.

20. The cutting device according to claim 1 further comprising saw blade socket rings, wherein the circular saw blades are fixedly mounted to the saw blade socket rings and axially displaceable on the drive shaft.

21. The cutting device according to claim 1 wherein the hydraulic clamping element is a hydraulic clamping strip.

22. A device for cutting materials comprising:
   - at least two circular saw blades;
   - a centrally aligned drive shaft that is movable to provide a rotary cutting movement to the at least two circular saw blades, and wherein at least one circular saw blade is mounted displaceable axially on the drive shaft to vary a cutting width of the materials to be cut;
   - disc like support bodies axially displaceable on the drive shaft, wherein at least one circular saw blade is fixedly mounted on each support body, wherein each support body has a nut; and
   - guide spindles running parallel to the axis of the drive shaft and engaging through the support bodies, wherein the guide spindles carry out the axial displacement of the circular saw blades, wherein the guide spindles are movable during the circular cutting movement of the circular saw blades on a circular path about the axis of the drive shaft; wherein the guide spindles are fixed axially on the drive shaft and wherein each guide spindle is associated with a respective single one of the support bodies and is screwed into the associated nut of the respective single one of the support bodies.

* * * * *